US006877264B2

(12) United States Patent
Mautz

(10) Patent No.: US 6,877,264 B2
(45) Date of Patent: Apr. 12, 2005

(54) UNIVERSAL SNAP-IN-PLACE CUSTOMER LABEL PLATE

(75) Inventor: Timothy E. Mautz, San Anselmo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 3 days.

(21) Appl. No.: 10/087,084

(22) Filed: Mar. 1, 2002

(65) Prior Publication Data

US 2003/0163940 A1 Sep. 4, 2003

(51) Int. Cl.$^7$ .................................................. G06F 1/16

(52) U.S. Cl. .......................... 40/663; 40/611; 361/683; 361/685

(58) Field of Search .......................... 40/663, 668, 611, 40/64; 361/683, 685, 724; 174/17 R, 50, 66, 67; 24/625; 428/99, 100, 119, 192, 31

(56) References Cited

U.S. PATENT DOCUMENTS 5,016,375 A 5/1991 Ngian et al.
5,054,057 A * 10/1991 Wilson ........................ 379/155
5,495,390 A * 2/1996 Yu ............................. 361/683
5,862,616 A * 1/1999 Peroni ..................... 40/607.15
6,026,603 A 2/2000 Kump et al.
6,341,755 B1 * 1/2002 Kump ................... 248/220.41
6,357,154 B1 3/2002 Pfendler et al.
6,470,613 B1 10/2002 Wildrick

* cited by examiner

*Primary Examiner*—Cassandra Davis
(74) *Attorney, Agent, or Firm*—Meyertons Hood Kivlin Kowert & Goetzel, P.C.; B. Noël Kivlin

(57) ABSTRACT

A label holder for labeling a rack-mounted computer system component is provided. The label holder includes an elongated body, a plurality of legs, and at least one retaining foot on at least one of the legs. Additionally, the holder may include one or more stiffening members and/or one or more shoulder ledges. The holder may be installed on a ventilation grating on a surface of the computer system component. The holder may be configured to allow air to flow between the holder and computer system component, so that cooling air is not prevented from flowing through the computer system component by the holder. At least one leg and/or the elongated body may be elastically deformable to allow at least one retaining foot to be engaged with an opening on the surface of the computer system component. Additionally, one or more of the retaining feet may have a beveled lower surface that may assist in installing the holder. A label applied to the holder may be written directly on a surface of the holder, affixed by adhesive or magnetically or physically coupled to the holder.

43 Claims, 3 Drawing Sheets

UNIVERSAL SNAP-IN-PLACE CUSTOMER LABEL PLATE

BACKGROUND OF THE INVENTION

1. Field of the Invention

Embodiments presented herein generally relate to a label holder and method for labeling rack-mounted and/or cabinet-mounted computer system components.

2. Description of the Relevant Art

Rack-mounting of computer hardware has become commonplace. Rack-mounting computer hardware allows components to be stacked vertically. These installations tend to minimize floor space (or footprint) required for computer system components. Minimizing footprint may generally allow for optimum use of floor space and/or heating, ventilation and air conditioning (HVAC) capacity. Minimizing footprint may be especially important for computer system installations where existing facilities are being upgraded, since expanding rooms or buildings may be prohibitively expensive. Additionally, rack-mounting may allow centralization of computer hardware. Centralizing computer hardware may provide increased security of computer systems as compared to decentralized configurations. Centralizing computer hardware may also improve ease of computer system administration as compared to decentralized configurations.

In recent years, the demand for computing power has grown rapidly. This demand for increased computing power has often been met by upgrading or replacing existing computer hardware. Since even rack-mounted installations may be space constrained, it may be desirable to minimize space taken up by each computer system component. Thus, there has been a drive within the computer industry to reduce computer component form factors. A commonly recognized computer industry form factor unit has been developed by which computer system components may be measured. The form factor unit, commonly referred to as a "U," generally describes a rack or cabinet mountable computer system component having a height not greater than about 1.75 inches. Depending on the specific requirements of each computer component (e.g., cooling, mounting and power requirements), as many as 41 individual 1U components may be mounted in a 72-inch high rack.

Typically, individual computer system components may be named and/or numbered. For routine maintenance or computer system disruptions, it may be important for personnel to be able to identify each individual component of a computer system. For example, computer system administration software may identify a computer system component that has a problem by the component's assigned number. With a large number of components per rack and possibly a large number of racks in a single installation, it may be difficult for personnel to identify the component quickly. To counter this problem, computer system components may be labeled with their assigned name and/or number. Much of the front surface area of each computer system component may include ventilation grating. Applying identification labels to a ventilation grating may restrict ventilation through the component. Restricting ventilation may create a risk of equipment damage or reduced equipment performance due to excessive heat buildup. This concern may be especially true for low U components (e.g., 1U), since the available ventilation area of these components may be substantially reduced as compared to higher U components (e.g., 3U). Thus, an improved method of identifying computer components in a rack-mounted or cabinet-mounted installation that does not significantly obstruct airflow may be desired.

SUMMARY OF THE INVENTION

Embodiments presented herein generally relate to a label holder and method for labeling rack-mounted computer system components.

In an embodiment, a label holder may include an elongated body, a plurality of legs extending from the body, and at least one retaining foot coupled to at least one leg. The elongated body may be configured to retain an identification label. Additionally, the dimensions of the body and the legs may be selected to allow air to flow around and beneath the holder.

Some embodiments of a label holder may include a shoulder ledge. The combination of the shoulder ledge and at least one retaining foot may be configured to keep the elongated body at a desired distance from the surface of the computer system component. Additionally, some embodiments may include one or more stiffening members. For example, a stiffening member may be coupled to each leg. The stiffening members may also be coupled to the elongated body. In such embodiments, a shoulder ledge may be formed on the bottom of one or more stiffening members.

After providing a label holder, a computer system component may be labeled by placing an identification label on the holder and engaging at least one retaining foot of the holder with an opening in a surface of the computer system component. Placing an identification label on the holder may include affixing an adhesive label to the holder, writing on the holder or magnetically or physically applying a label to the holder. Engaging at least one retaining foot of the holder with an opening on the surface of the computer system component may include sliding a first retaining foot into a first opening. A second retaining foot may then be engaged with a second opening in the surface. The second retaining foot may be engaged with the second opening by applying an engaging force. Alternately, at least one leg and/or the elongated body may be elastically deformed to allow the second retaining foot to engage the second opening.

BRIEF DESCRIPTION OF THE DRAWINGS

Other objects and advantages of the invention will become apparent upon reading the following detailed description and upon reference to the accompanying drawings in which.

Figure 1:
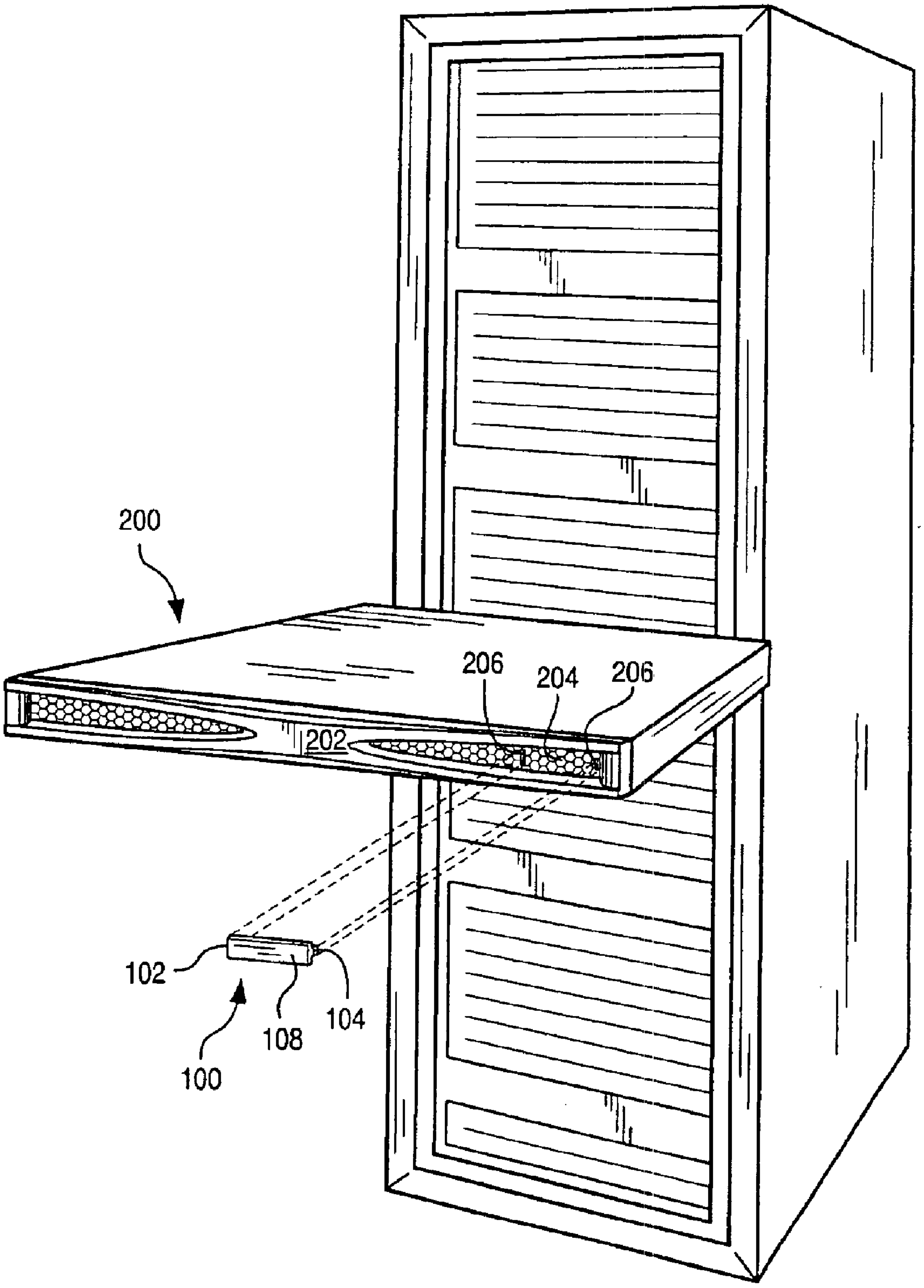
FIG. 1 is an exploded perspective side view of a rack-mounted computer system with a label holder.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used here in, "rack-mounting" generally refers to mounting within a rack or shelving system. Typical rack-mounting systems may employ several vertical members arranged to provide support for mounted components. Racks may be movable or fixed. Racks may be integrated with portions of a computer system. For example, a rack may include but is not limited to a power distribution system, a communications system, a ventilation system and/or quick connectors coupled to such systems. As used herein, "cabinet-mounting" generally refers to rack-mounting in a rack having restricted access, such as closable doors. Thus, rack-mounting may refer to both mounting within a rack or shelving system and mounting within a cabinet.

Rack-mounting of computer system components may allow more efficient use of space than utilizing comparable free-standing computer components (e.g., desktop or tower computers). Since a large number of rack-mounted computer system components may be located in a given space, computer system maintenance may be eased. For example, performing physical modifications of the components, configuring the components and/or installing software on the components may be eased by the close proximity of the components. A difficulty that may be encountered, however, in administering rack-mounted systems may be identifying individual computer system components. For example, common rack-mounting systems may allow 40 or more 1U computer system components to be mounted within a single rack. Selecting a desired computer system component from such a rack may be difficult if the components are not clearly labeled. As used herein, a "1U component" generally refers to a computer system component with a form factor of about one U (e.g., 1.75 inches).

As used herein, a "computer system component" generally refers to an individual component of a computer system. A computer system component may include but is not limited to a computer device (e.g., a server, a client, a workstation, an internet appliance), a communications device (e.g., a router, a hub, a switch, a data acquisition device), a memory device (e.g., a device including an optical, electronic and/or magnetic memory medium), a power device (e.g., a power supply, an uninterrupted power supply, a back-up power supply), or another device such as is well known in computer systems, distributed networks, wide area networks, local area networks, communications systems, etc.

A computer component may include an area designed and/or used to allow air to flow through the component. As used herein, such an area may be generally referred to as a "ventilation grating." A ventilation grating may include a grating, a screen, a grille, a perforated protective covering, etc., which allows air to pass through the component.

Computer system components may be identified by affixing an identification label to each component or to the rack using adhesive. For example, identification labels may be written on tape, which may be applied to a computer system component or rack. Placing an adhesive label on the rack may present several concerns. First, the label may leave an adhesive residue on the rack if the label is removed. Second, placing a label on the rack identifies a location on the rack, but does not necessarily identify a computer system component. For example, if the name on the label is the name of the computer system component and the computer system component is relocated, the label is not automatically relocated with the component. Therefore, depending on the labeling scheme, the label may have to be removed from the rack and applied to the rack to which the component is relocated. Failure to do so may lead to confusion during future system administration.

Applying an adhesive label directly to a computer system component may present the same concern of adhesive residue if the label is removed. Additionally, labels installed in this fashion may prevent cooling air from flowing through portions of the component. Computer system components designed for rack-mounting may have a large portion of the front surface dedicated to ventilation grating. If an adhesive label blocks all or part of the ventilation grating of the component, system performance may be degraded. Additionally, adhesive labels are generally not reusable. Thus, if a label must be removed, a new label may need to be made to replace it. To overcome the shortcomings of adhesive labels in identifying computer system components, it may be desirable to provide an inexpensive, reusable label holder for a component that allows cooling air to flow around and under the label.

FIG. 1 depicts an embodiment of a label holder 100 that may be used to apply an identification label to a surface 202 of a computer system component 200. In an embodiment, surface 202 may include a ventilation grating 204. Label holder 100 may be configured such that air may flow around and beneath the holder when it is installed on ventilation grating 204.

Label holder 100 may include an elongated body 102 and a plurality of legs 104 (best seen in FIG. 2) extending from elongated body 102. At least one leg 104 may have a retaining foot 106 (best seen in FIG. 2). Retaining foot 106 may be configured to engage an opening 206 formed on surface 202 of a computer system component 200 (see FIG. 1). Opening 206 may be an opening designed to allow air flow through computer system component 200. For example, opening 206 may be one of a set of substantially identical openings in a screen. Alternately, opening 206 may be an opening formed specifically to allow label holder 100 to be coupled to surface 202.

Figure 2:
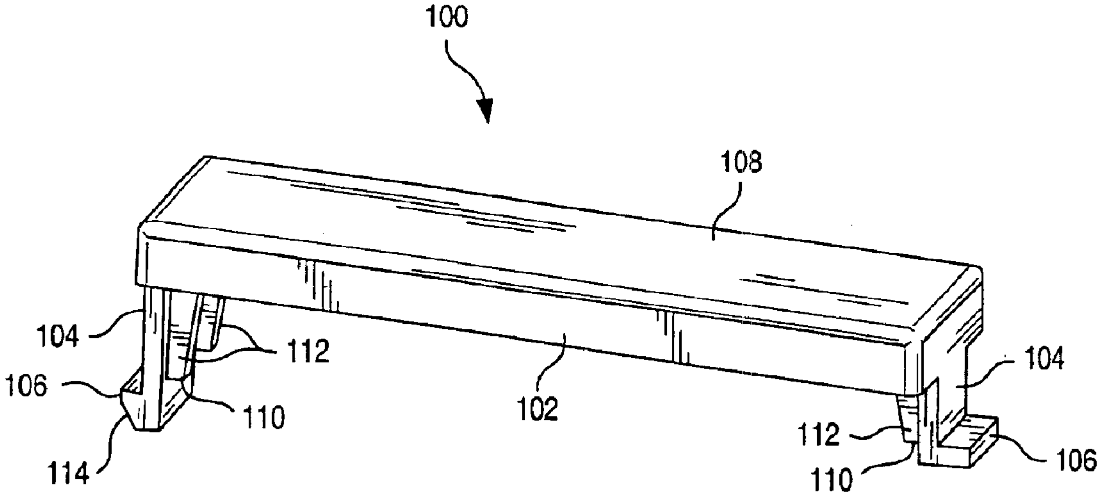
FIG. 2 is a side perspective view of an embodiment of a label holder.

Elongated body 102 may include a labeling surface 108 (see FIG. 2). In an embodiment, labeling surface 108 may be configured to retain an adhesive label. In another embodiment, labeling surface 108 may include a writing surface that may allow a user to write a name assigned to computer system component 200 directly on surface 108. In yet another embodiment, labeling surface 108 may be configured to retain non-adhesive labeling media. For example, a label may be retained on labeling surface 108 magnetically, with a hook and loop fastener, within slides or rails, etc.

FIG. 2 depicts a perspective side view of an embodiment of label holder 100. Legs 104 may have a length determined to allow air flow between holder 100 and a computer system component to which the holder is coupled. At least one leg may have a shoulder ledge 110. Shoulder ledge 110 may be configured to keep the elongated body at least a predetermined minimum distance from surface 202. At least one shoulder ledge 110 and at least one retaining foot 106 may be configured to restrict the motion of holder 100 relative to surface 202.

In an embodiment, label holder 100 may include at least one stiffening member 112 coupled to at least one leg 104. Stiffening member 112 may also be coupled to elongated body 102. Stiffening member 112 may mechanically reinforce leg 104. Shoulder ledge 110 may be formed on stiffening member 112.

At least one retaining foot 106 may include a beveled or rounded lower surface 114. When the holder is being installed on a computer system component, beveled surface 114 may provide a lateral component of force to at least one of the legs. The lateral component of force may elastically deform at least one of the legs 104 and/or elongated body 108 to allow the retaining foot to be inserted into opening 206.

Figure 3:
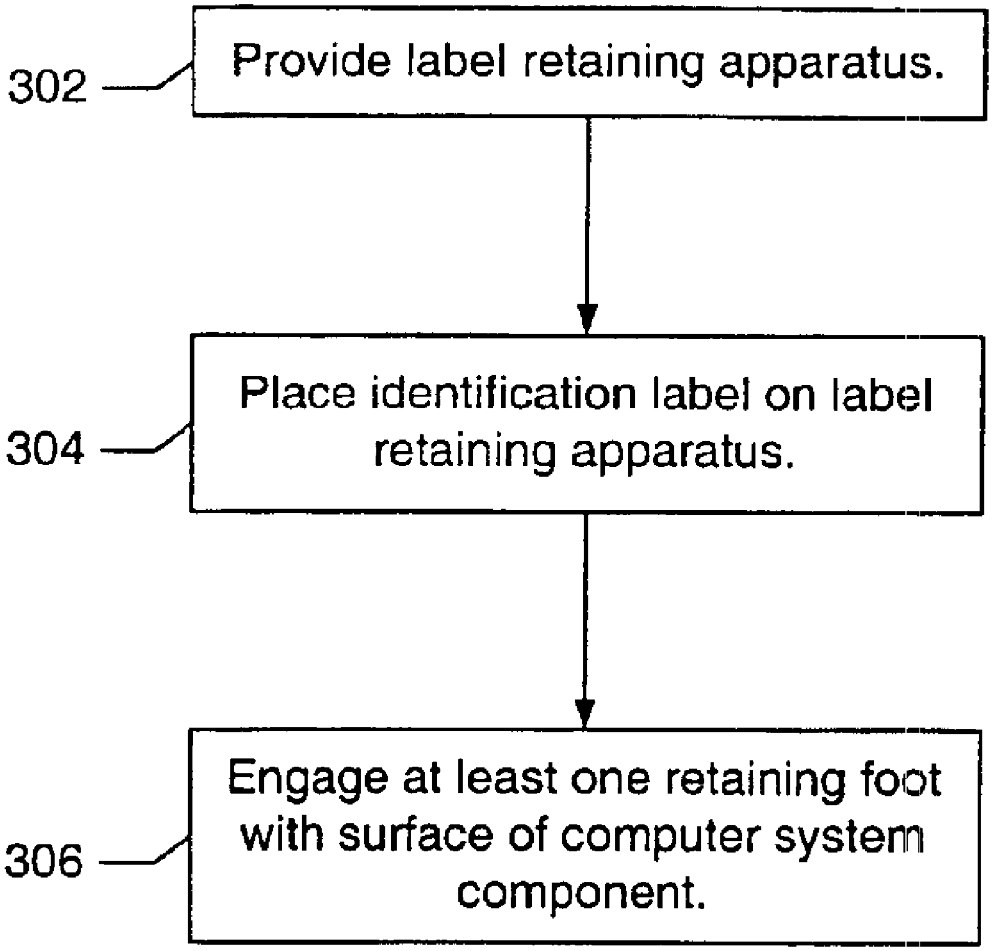
FIG. 3 is a flow chart of a method of labeling a rack-mounted computer system component according to one embodiment.

FIG. 3 depicts an embodiment of a method of labeling rack-mounted computer system components. Step 302 indicates that a label holder, as described above, may be provided. An identification label may be placed on the label holder at step 304. As previously described, the identification label may be placed on the label holder using adhesive or magnetically and/or physically (e.g., with a hook and loop fastener, etc.). The at least one retaining foot of the label holder may be engaged with the surface of the computer system component at step 306. In an embodiment, engaging at least one foot of the holder may include sliding a first retaining foot into a first opening on the surface of the computer system component. A second retaining foot may then be engaged with a second opening on the surface by applying an engaging force to the holder. As used herein, an "engaging force" may refer to a force that tends to urge the elongated body toward the surface of the computer system component to which the labeling holder is being applied. In an embodiment where the second retaining foot has a beveled lower surface, the engaging force may cause the beveled surface to generate a component of force that tends to deform at least one of the legs such that the second retaining foot may engage the second opening in the surface of the computer system component. In an alternate embodiment, the second retaining foot may be engaged with the second opening by elastically deforming at least one leg and/or the elongated body such that the retaining foot may be engaged with the opening.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A label holder for retaining an identification label on a surface of a rack-mounted computer system component, the surface of the rack-mounted computer system component comprising a ventilation grating, the holder comprising:

an elongated body;

a plurality of legs extending from the body;

at least one retaining foot coupled to at least one leg proximate an end of the leg; and a shoulder ledge proximate an end of at least one leg;

wherein each retaining foot is configured to engage an opening in the surface of the rack-mounted computer system component during use, wherein, when each retaining foot is engaged to an opening in the surface of the rack-mounted computer system, each combination of a retaining foot and a shoulder ledge is configured such that the elongated body is spaced from the surface of the rack-mounted computer system, and wherein dimensions of the elongated body are selected to allow airflow between the holder and the rack-mounted computer system component during use.

2. The holder of claim 1, wherein the combination of the shoulder ledge and at least one retaining foot is configured to limit motion of the label holder such that the holder maintains a predetermined distance from the surface of the rack-mounted computer system component during use.

3. The holder of claim 2, wherein the predetermined distance is selected such that the holder does not precluded airflow through the ventilation grating.

4. The holder of claim 1, further comprising at least one stiffening member coupled to at least one of the legs and the elongated body, wherein the at least one stiffening member is configured to brace the at least one leg to the elongated body.

5. The holder of claim 1, wherein the at least one retaining foot comprises a beveled lower surface, wherein the beveled lower surface is configured to provide a lateral component of force to at least one of the legs when an engaging force is applied to the holder.

6. The holder of claim 1, wherein dimensions of the legs are selected to allow airflow between the holder and the rack-mounted computer system component during use.

7. The holder of claim 1, wherein the holder comprises plastic.

8. A method of labeling a rack-mounted computer system component comprising: providing a label holder comprising:

an elongated body;

a plurality of legs coupled to the body; and at least one retaining foot coupled to at least one leg proximate an end of the leg; placing an identification label on the label holder; and engaging the at least one retaining foot of the label holder with at least one opening in a surface of the computer system component, wherein the surface of the rack-mounted computer system component comprises a ventilation grating.

9. The method of claim 8, wherein the label holder further comprises a shoulder ledge proximate an end of at least one leg.

10. The method of claim 8, wherein the label holder further comprises a shoulder ledge proximate an end of at least one leg, and wherein the combination of the shoulder ledge and at least one retaining foot is configured to limit motion of the label holder such that the holder maintains a predetermined distance from the surface of the rack-mounted computer system component during use.

11. The method of claim 8, wherein the label holder further comprises a shoulder ledge proximate an end of at least one leg, wherein the combination of the shoulder ledge and the at least one retaining foot is configured to limit motion of the label holder such that the holder maintains a predetermined distance from the surface of the rack-mounted computer system component during use, and wherein the predetermined distance is selected such that the holder does not preclude airflow through the ventilation grating.

12. The method of claim 8, wherein engaging the at least one retaining foot with the surface of the computer system component comprises sliding a first retaining foot into a first opening, and applying an engaging force to the holder such that at least a second retaining foot engages a second opening in the surface.

13. The method of claim 8, wherein engaging at least one retaining foot with the surface of the computer system component comprises elastically deforming the combination of the elongated body and the plurality of legs to allow insertion of the at least one retaining foot into the at least one opening in the surface of the computer system component.

14. The method of claim 8, wherein placing an identification label on the label holder comprises applying an adhesive label to the holder.

15. The method of claim 8, wherein placing an identification label on the label holder comprises writing on a surface of the holder.

16. The method of claim 8, wherein the label holder further comprises at least one stiffening member coupled to at least one of the legs.

17. The method of claim 8, wherein the label holder further comprises at least one stiffening member coupled to at least one of the legs and the elongated body, wherein the at least one stiffening member is configured to brace the at least one leg to the elongated body.

18. The method of claim 8, wherein the label holder further comprises at least one stiffening member coupled to at least one of the legs, wherein an end of the at least one stiffening member comprises a shoulder ledge.

19. The method of claim 8, wherein engaging at least one retaining foot with at least one opening in a surface of the computer system component comprises applying an engaging force to the holder, wherein the at least one retaining foot comprises a beveled lower surface, and wherein the beveled lower surface is configured to provide a lateral component of force to at least one of the legs when an engaging force is applied to the holder.

20. The method of claim 8, wherein dimensions of the elongated body are selected to allow airflow between the holder and the rack-mounted computer system component while the holder is engaged with the surface of the rack-mounted computer system component.

21. The method of claim 8, wherein the elongated body comprises a surface configured to retain an identification label.

22. A label holder for retaining an identification label on a surface of a rack-mounted computer system component, the surface of the rack-mounted computer system component comprising a ventilation grating, the holder comprising:

an elongated body;

a plurality of legs extending from the body;

at least one retaining foot coupled to at least one leg proximate an end of the leg; and a shoulder ledge proximate an end of at least one leg;

wherein each retaining foot is configured to engage an opening in the surface of the rack-mounted computer system component during use, and wherein, when each retaining foot is engaged to an opening in the surface of the rack-mounted computer system, each combination of a retaining foot and a shoulder ledge is configured such that the elongated body is spaced from the surface of the rack-mounted computer system.

23. The holder of claim 22, wherein the combination of the shoulder ledge and at least one retaining foot is configured to limit motion of the label holder such that the holder maintains a predetermined distance from the surface of the rack-mounted computer system component during use.

24. The holder of claim 23, wherein the predetermined distance is selected such that the holder does not precluded airflow through the ventilation grating.

25. The holder of claim 22, wherein the combination of the elongated body and the plurality of legs is elastically deformable to allow insertion of at least one retaining foot into the opening in the surface of the computer system component.

26. The holder of claim 22, further comprising at least one stiffening member coupled to at least one of the legs.

27. The holder of claim 22, further comprising at least one stiffening member coupled to at least one of the legs and the elongated body, wherein the at least one stiffening member is configured to brace the at least one leg to the elongated body.

28. The holder of claim 22, further comprising at least one stiffening member coupled to at least one of the legs, wherein an end of the at least one stiffening member comprises a shoulder ledge.

29. The holder of claim 22, wherein the at least one retaining foot comprises a beveled lower surface, wherein the beveled lower surface is configured to provide a lateral component of force to at least one of the legs when an engaging force is applied to the holder.

30. The holder of claim 22, wherein the elongated body comprises a surface configured to retain an identification label.

31. The holder of claim 22, wherein dimensions of the legs are selected to allow airflow between the holder and the rack-mounted computer system component during use.

32. The holder of claim 22, wherein the holder comprises plastic.

33. A label holder for retaining an identification label on a surface of a rack-mounted computer system component, the surface of the rack-mounted computer system component comprising a ventilation grating, the holder comprising:

an elongated body;

a plurality of legs extending from the body;

at least one retaining foot coupled to at least one leg proximate an end of the leg; and at least one stiffening member coupled to at least one of the legs, wherein an end of the at least one stiffening member comprises a shoulder ledge;

wherein each retaining foot is configured to engage an opening in the surface of the rack-mounted computer system component during use;

wherein the shoulder ledge is proximate an end of at least one leg, and wherein the combination of the shoulder ledge and at least one retaining foot is configured to limit motion of the label holder such that the elongated body maintains a predetermined spaced distance from the surface of the rack-mounted computer system component during use.

34. The holder of claim 33, wherein the predetermined distance is selected such that the holder does not precluded airflow through the ventilation grating.

35. The holder of claim 33, wherein the combination of the elongated body and the plurality of legs is elastically deformable to allow insertion of at least one retaining foot into the opening in the surface of the computer system component.

36. The holder of claim 33, wherein the at least one stiffening member is also coupled to the elongated body, wherein the at least one stiffening member is configured to brace the at least one leg to the elongated body.

37. The holder of claim 33, wherein the at least one retaining foot comprises a beveled lower surface, wherein the beveled lower surface is configured to provide a lateral component of force to at least one of the legs when an engaging force is applied to the holder.

38. The holder of claim 33, wherein the elongated body comprises a surface configured to retain an identification label.

39. The holder of claim 33, wherein dimensions of the legs are selected to allow airflow between the holder and the rack-mounted computer system component during use.

40. The holder of claim 33, wherein the holder comprises plastic.

41. A label holder for retaining an identification label on a surface of a rack-mounted computer system component, the surface of the rack-mounted computer system component comprising a ventilation grating, the holder comprising:

an elongated body;

a plurality of legs extending from the body;

at least one retaining foot coupled to at least one leg proximate an end of the leg; and a shoulder ledge proximate an end of at least one leg;

wherein each retaining foot is configured to engage an opening in the surface of the rack-mounted computer system component during use;

wherein, when each retaining foot is engaged to an opening in the surface of the rack-mounted computer system, each combination of a retaining foot and a shoulder ledge is configured such that the elongated body is spaced from the surface of the rack-mounted computer system;

wherein the combination of the elongated body and the plurality of legs is elastically deformable to allow insertion of at least one retaining foot into the opening in the surface of the computer system component;

wherein dimensions of the elongated body are selected to allow airflow between the holder and the rack-mounted computer system component during use.

42. A label holder for retaining an identification label on a surface of a rack-mounted computer system component, the surface of the rack-mounted computer system component comprising a ventilation grating, the holder comprising:

an elongated body;

a plurality of legs extending from the body;

at least one retaining foot coupled to at least one leg proximate an end of the leg; and at least one stiffening member coupled to at least one of the legs, wherein an end of the at least one stiffening member comprises a shoulder ledge;

wherein each retaining foot is configured to engage an opening in the surface of the rack-mounted computer system component during use;

wherein, when each retaining foot is engaged to an opening in the surface of the rack-mounted computer system, each combination of a retaining foot and a shoulder ledge is configured such that the elongated body is spaced from the surface of the rack-mounted computer system;

wherein dimensions of the elongated body are selected to allow airflow between the holder and the rack-mounted computer system component during use.

43. A label holder for retaining an identification label on a surface of a rack-mounted computer system component, the surface of the rack-mounted computer system component comprising a ventilation grating, the holder comprising:

an elongated body;

a plurality of legs extending from the body; and at least one retaining foot coupled to at least one leg proximate an end of the leg;

wherein each retaining foot is configured to engage an opening in the surface of the rack-mounted computer system component during use;

wherein, when each retaining foot is engaged to an opening in the surface of the rack-mounted computer system, each combination of a retaining foot and a shoulder ledge is configured such that the elongated body is spaced from the surface of the rack-mounted computer system;

wherein the elongated body comprises a surface configured to retain an identification label;

wherein dimensions of the elongated body are selected to allow airflow between the holder and the rack-mounted computer system component during use.

* * * * *